Sept. 26, 1933.　　　W. F. NEWHOUSE　　　1,928,134
WIREBOUND BOX OR CRATE BLANK MACHINE
Filed Jan. 31, 1931　　　9 Sheets-Sheet 3

Inventor:
Walter F. Newhouse
By
Arthur F. Durand
Atty.

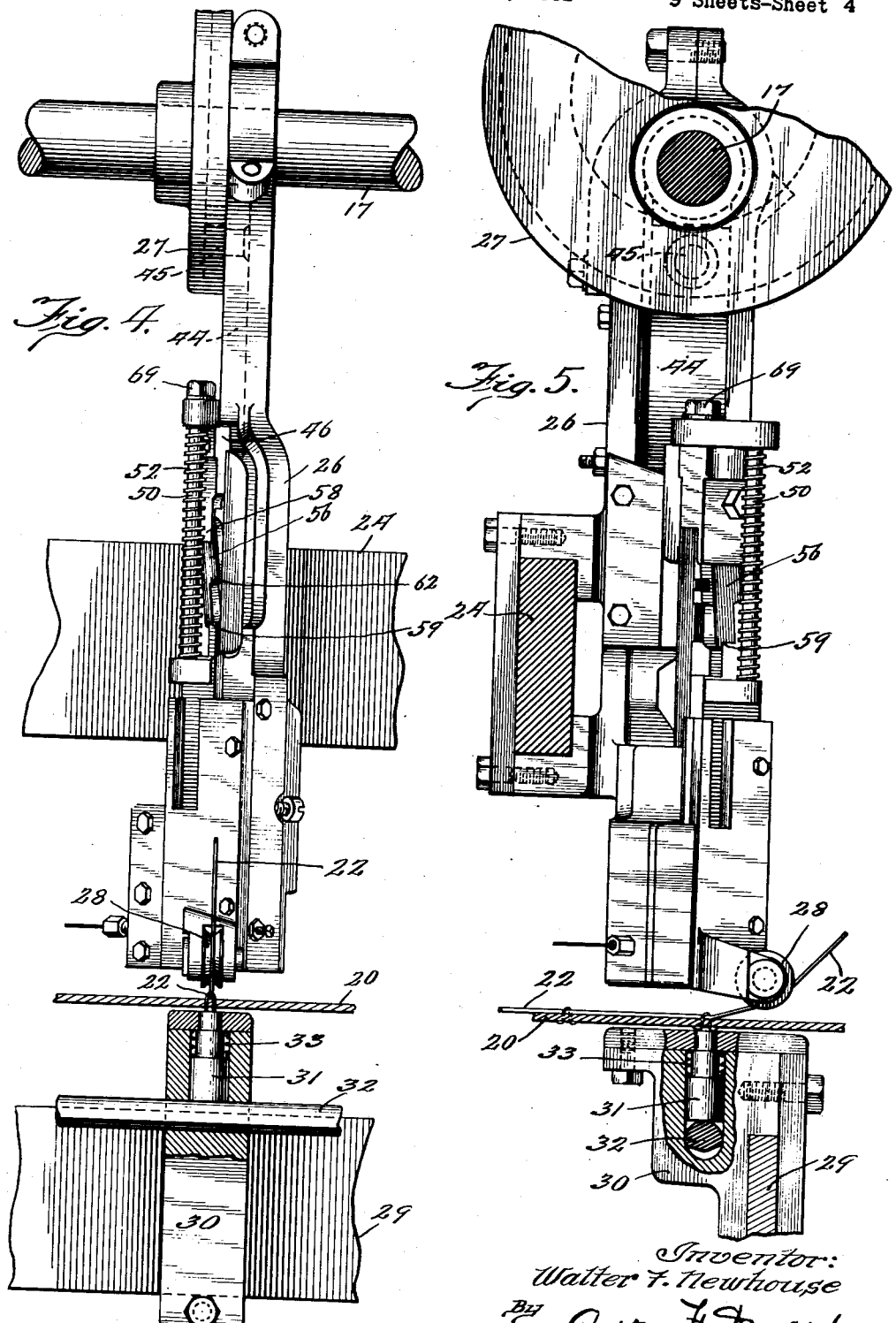

Sept. 26, 1933.  W. F. NEWHOUSE  1,928,134
WIREBOUND BOX OR CRATE BLANK MACHINE
Filed Jan. 31, 1931  9 Sheets-Sheet 5

Inventor:
Walter F. Newhouse
By Arthur F. Durand
Atty.

Sept. 26, 1933. W. F. NEWHOUSE 1,928,134
WIREBOUND BOX OR CRATE BLANK MACHINE
Filed Jan. 31, 1931 9 Sheets-Sheet 6
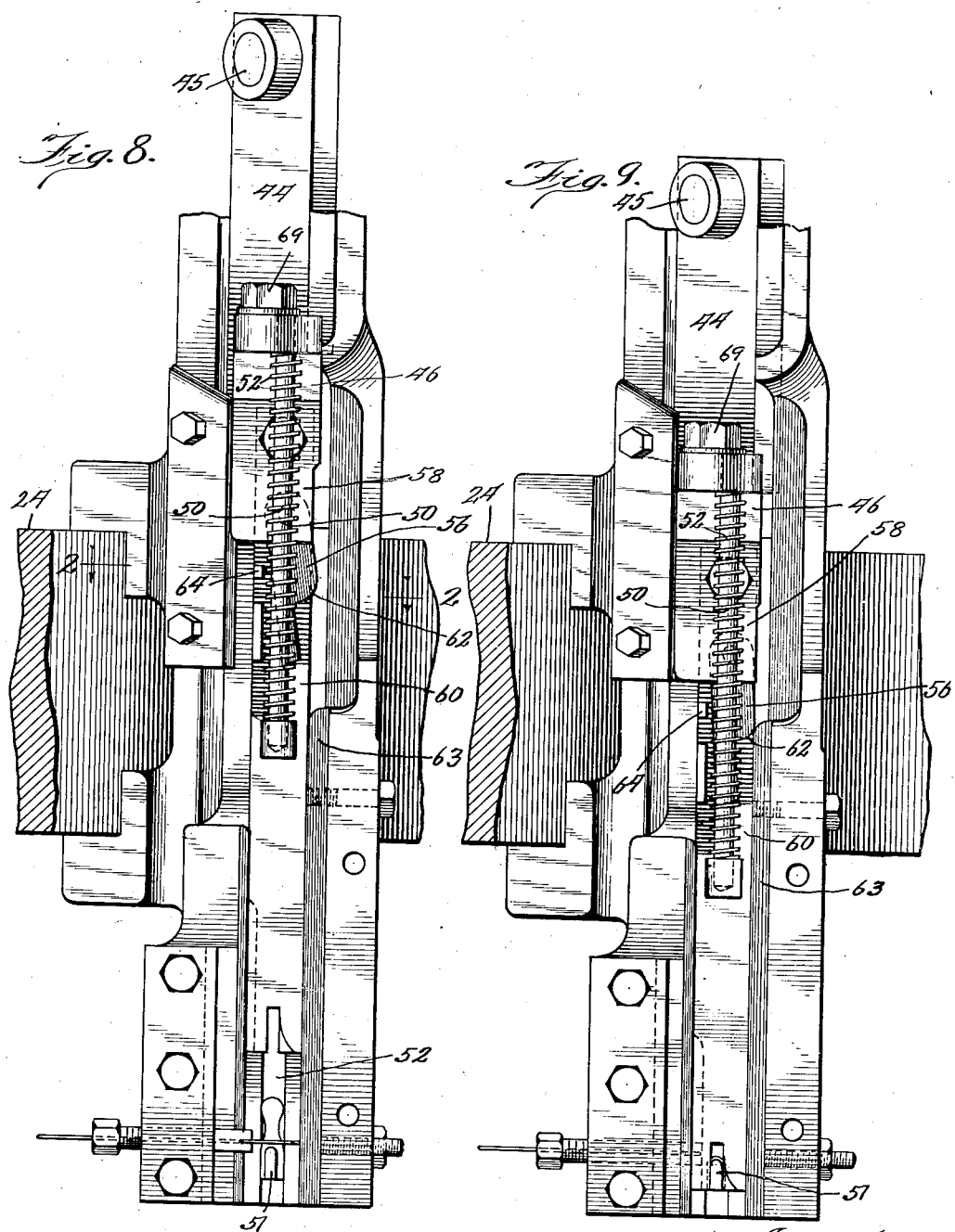

Sept. 26, 1933. W. F. NEWHOUSE 1,928,134
WIREBOUND BOX OR CRATE BLANK MACHINE
Filed Jan. 31, 1931 9 Sheets-Sheet 7

Inventor:
Walter F. Newhouse
By Arthur F. Durand
Atty.

Sept. 26, 1933. W. F. NEWHOUSE 1,928,134
WIREBOUND BOX OR CRATE BLANK MACHINE
Filed Jan. 31, 1931 9 Sheets-Sheet 8
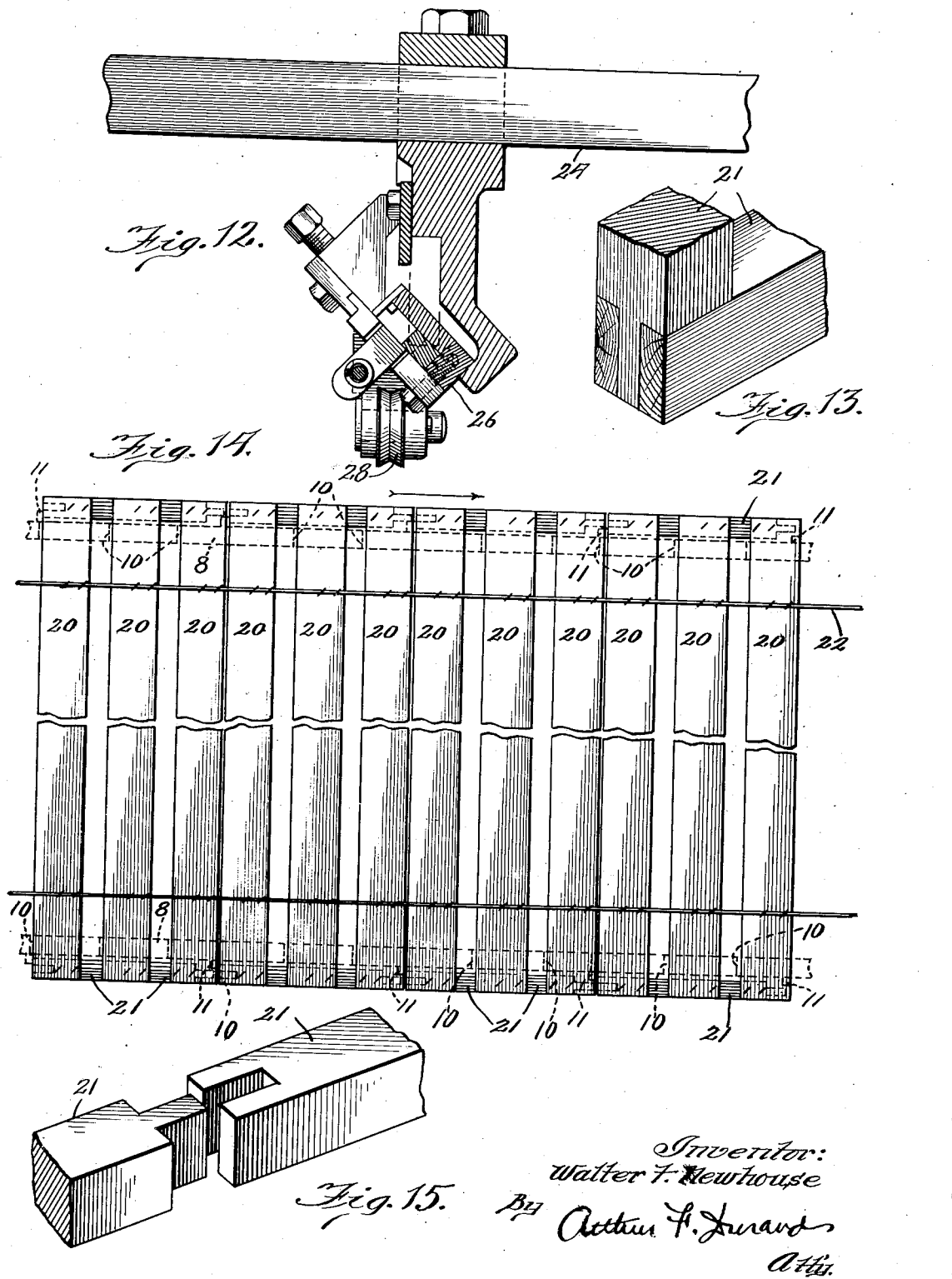
Inventor:
Walter F. Newhouse

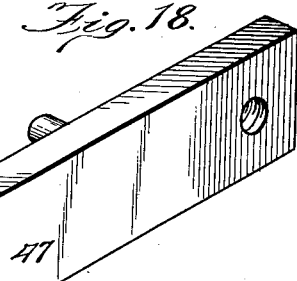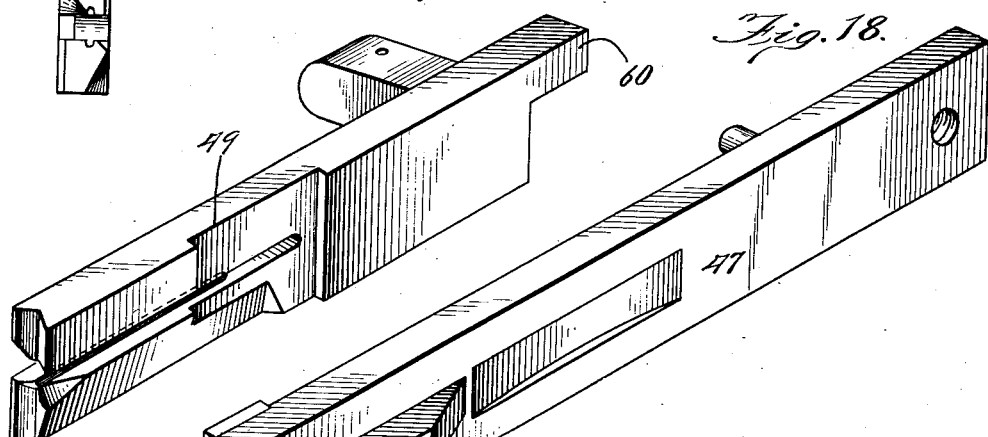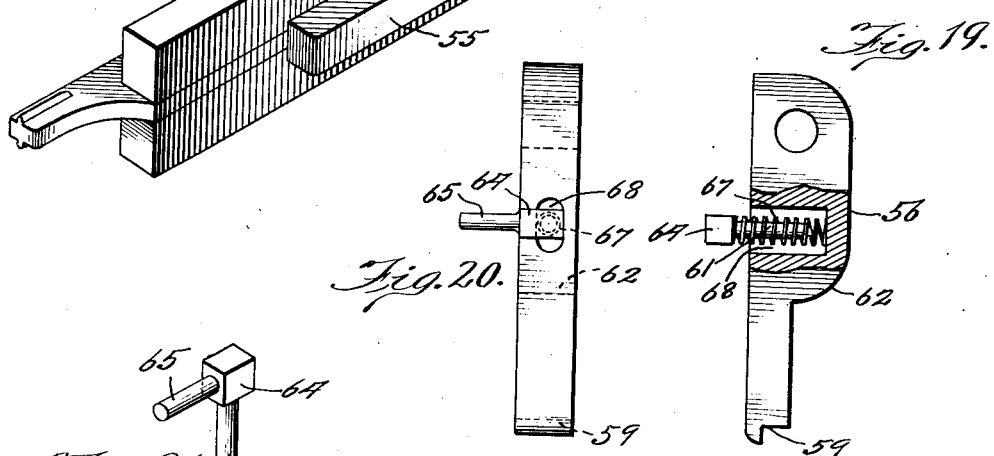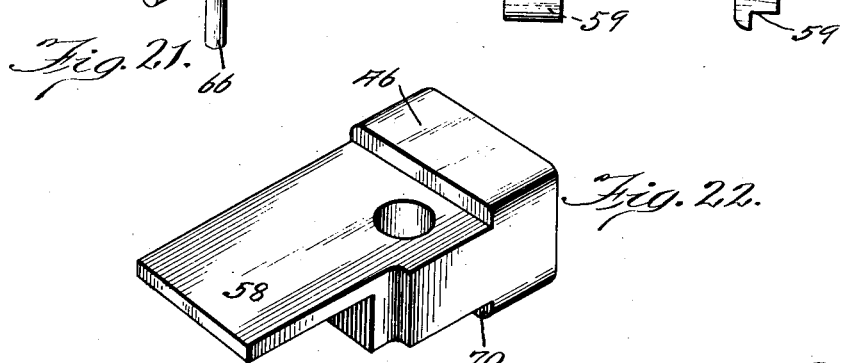

Patented Sept. 26, 1933

1,928,134

UNITED STATES PATENT OFFICE 1,928,134

WIREBOUND BOX OR CRATE BLANK MACHINE

Walter F. Newhouse, Benton Harbor, Mich.

Application January 31, 1931. Serial No. 512,647

24 Claims. (Cl. 1—8.2)

This invention relates to stapling machinery, and more particularly to machinery for making wire-bound boxes or crates, or other blanks or products which can be stapled together by a feeding motion thereof in a horizontal plane, in co-ordination with stapling mechanism arranged over said plane, thereby to staple the materials together as they pass under the stapling mechanism.

Generally stated, the object of the invention is to provide a novel and improved construction and arrangement, whereby work of this kind may be done expeditiously and in a satisfactory manner, at comparatively high speed, and without using features or elements heretofore considered necessary or desirable in machinery of this kind.

Another object is to provide a novel and improved construction whereby the staples are clinched on the under side of the work by one or more vertically reciprocating clinchers mounted in a swinging frame, or a frame that moves back and forth both above and below the plane of the work, whereby the staples are clinched in the desired manner, in co-operation with means carried by said frame for actuating said clinchers, and means for feeding the materials continuously, whereby the stapling mechanism carried by said frame is adapted to move a distance forward in unison with the work each time staples are inserted.

Another object is to provide a novel and improved construction whereby box or crate blanks are made by feed mechanism and stapling mechanism so relatively arranged that no binding wires are stapled in place over the cleats of the blanks, the cleats being held in place simply by staples inserted through the sheet material into the cleats, and all binding wires of the blanks being disposed at points between the cleats at one side edge of the blank and the cleats at the other side edge thereof, whereby the staplers that insert staples through the sheet material into the cleats do not need to have any means for feeding binding wires on to the blank materials, such binding-wire feeding means being allotted to and confined to the intermediate staplers that attach the binding wires to the sheet material only, and not to any cleats.

Another object is to provide a novel construction and arrangement whereby the above-mentioned three objects of the invention may be and are combined in one unitary machine, as will hereinafter more fully appear.

It is also an object to provide certain details and features of construction and combinations tending to increase the general efficiency and the desirability of stapling machinery of this particular character.

To the foregoing and other useful ends, the invention consists in the matters hereinafter set forth and claimed, and shown in the accompanying drawings, in which,—

Figs. 4, 5, 6, 7, 8, 9, 10 and 11 are side elevations of one of the staplers employed to fasten binding wires to the work, showing different sides of the said stapler, and showing the stapler parts in different positions.

Fig. 12 is a horizontal detail section of one of said staplers, on line 12—12 in Fig. 8 of the drawings.

Fig. 13 is a detail fragmentary perspective view of a portion of one of the boxes or crates.

Fig. 14 is a plan view of a crate blank made on the machine shown in the drawings, or box blank, of the wire-bound box type.

Fig. 15 is a detail fragmentary perspective view of the adjacent portions of two cleats of said blanks.

Fig. 16 is an end view of one of the staple formers of the stapling mechanism.

Fig. 17 is a perspective of one of said staple formers.

Fig. 18 is a perspective view of one of the staple drivers of the stapling mechanism.

Figure 1:
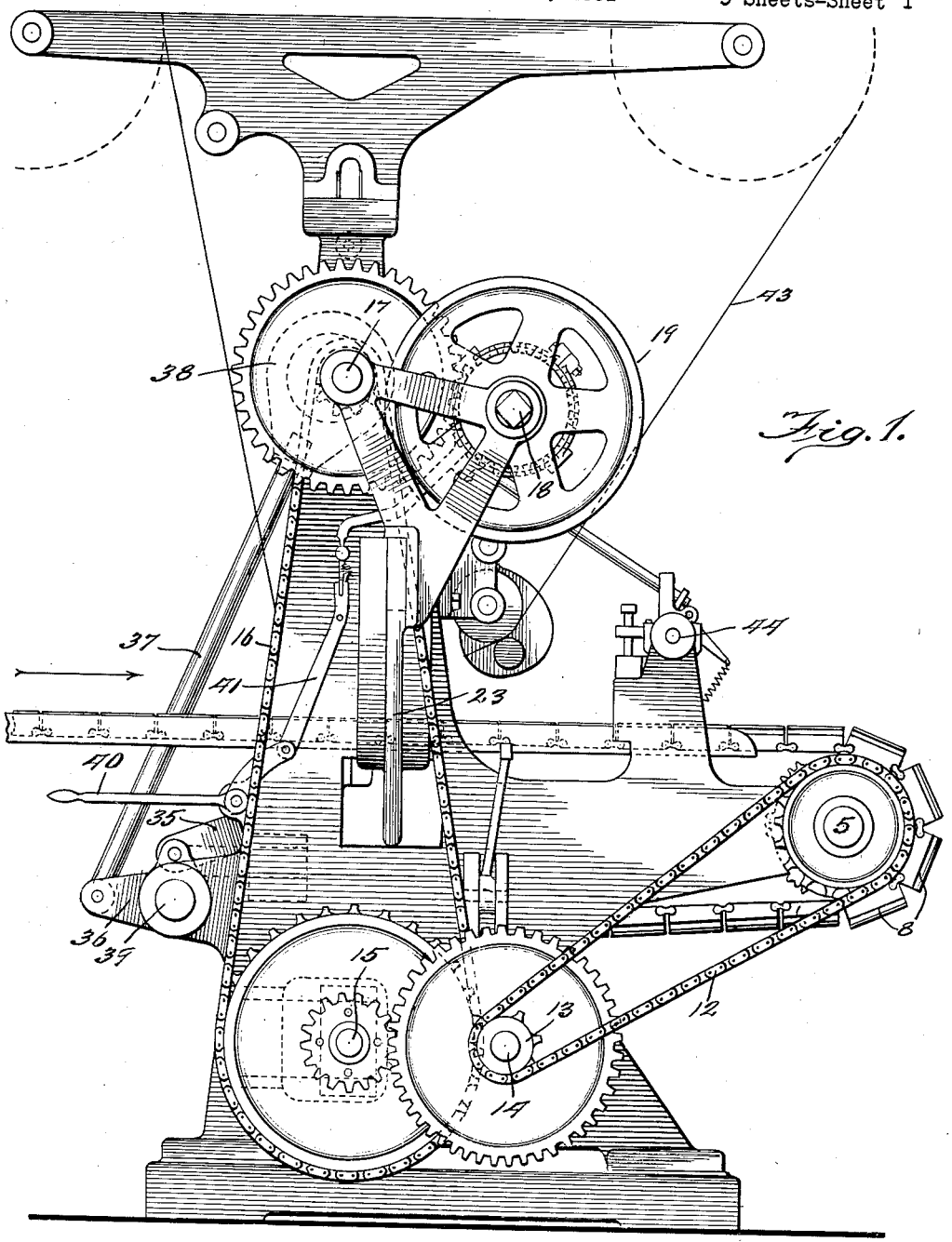
Fig. 1 is a side elevation of a stapling machine embodying the principles of the invention, showing one end portion of the machine broken away for convenience of illustration.
Figure 2:
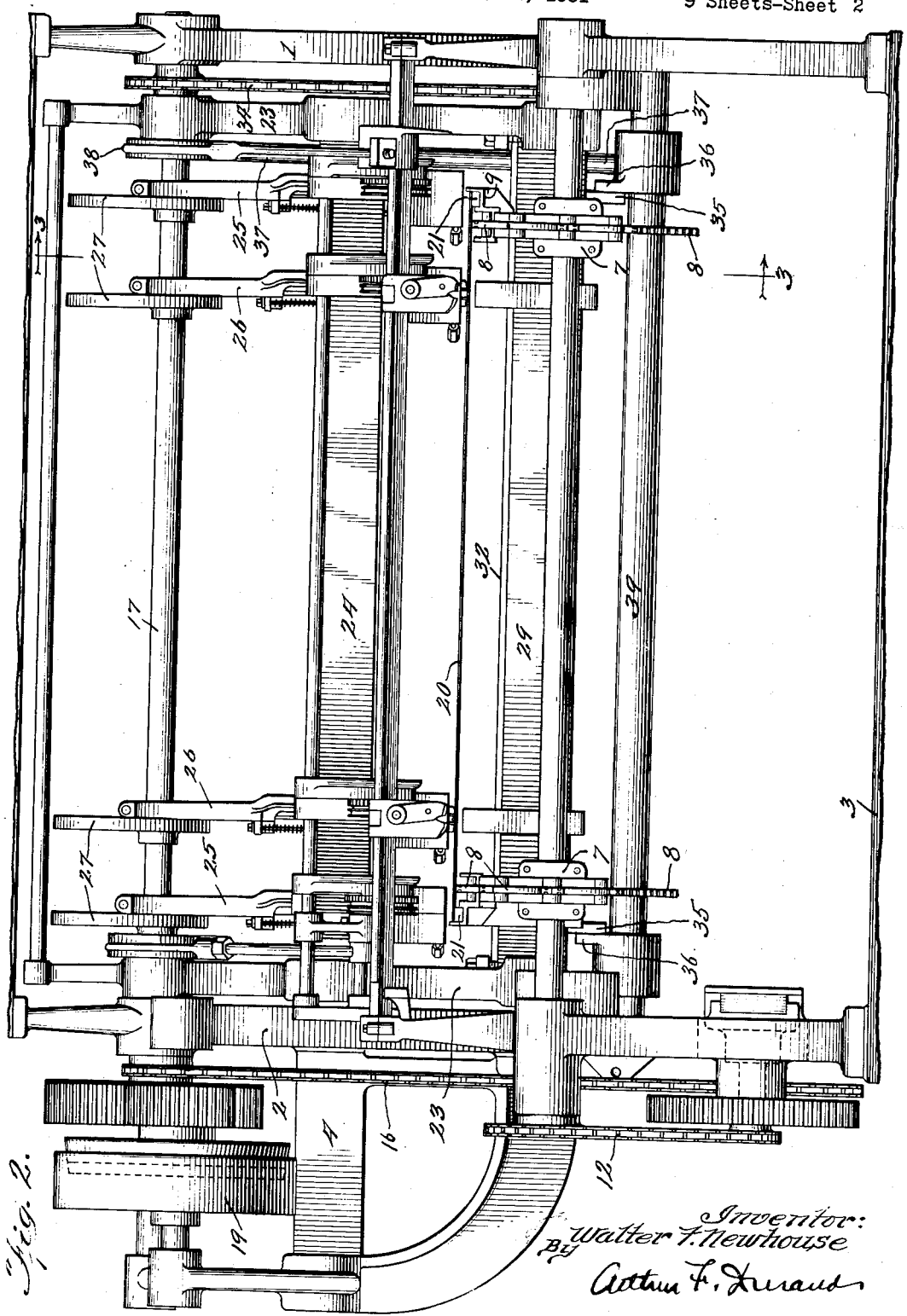
Fig. 2 is an end elevation of said machine.
Figure 3:
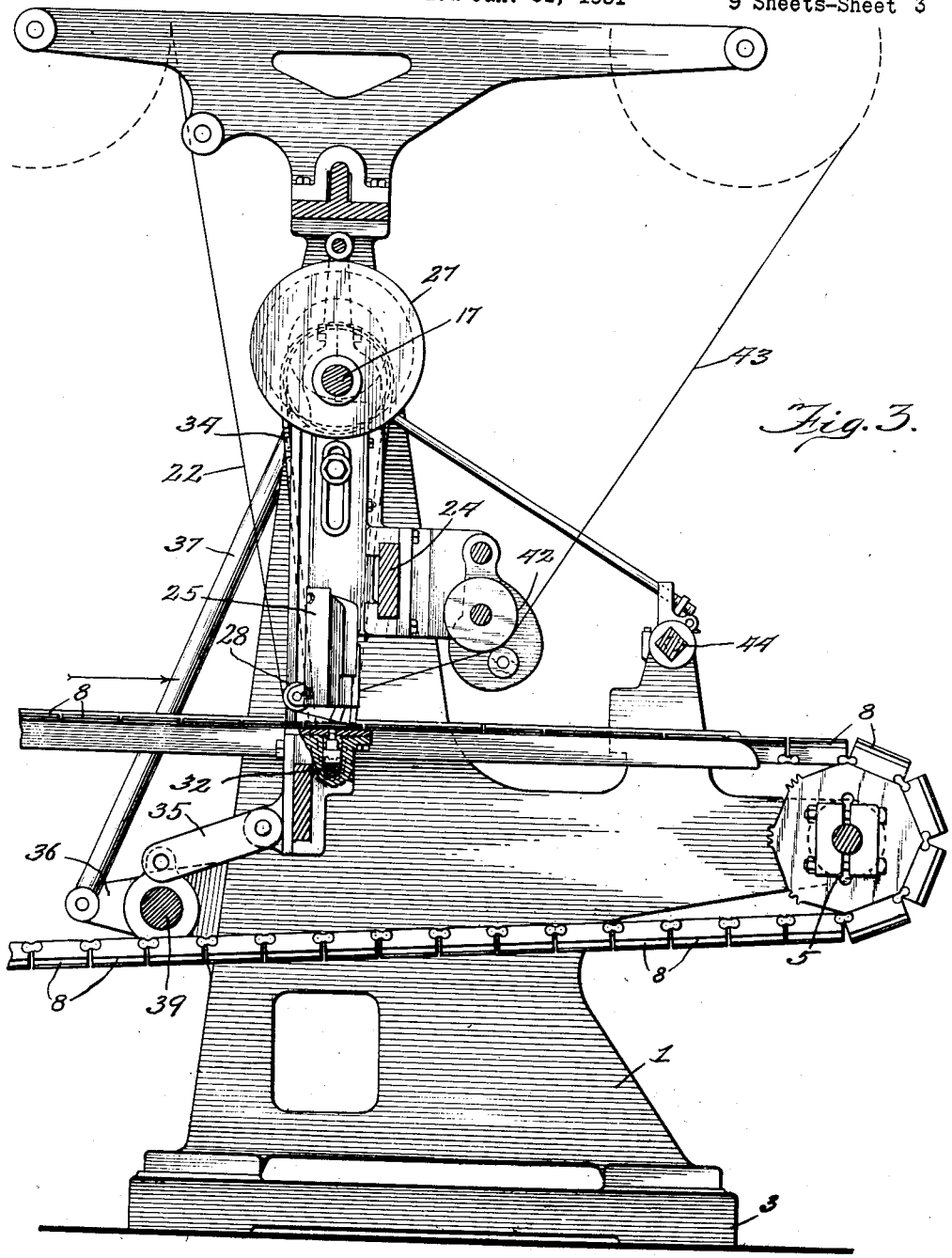
Fig. 3 is a vertical longitudinal section on line 3—3 in Fig. 2 of the drawings.

Figs. 19 and 20 are side elevations of one of the locking dogs employed for locking the staple driver to the staple former, until after the staple is inserted, when said locking dog is then actuated to unlock the driver and former and permit the driver to move downwardly alone, while the staple former continues to remain stationary with its lower end pressed tightly against the work, to support the staple while being inserted by the driver.

Fig. 21 is a perspective of a portion of the device shown in Figs. 19 and 20 of the drawings.

Fig. 22 is a perspective view of the block by which the staple driver is detachably connected to the vertically reciprocating member at the top of each stapler, by which member the stapler is actuated vertically to form and drive the staples.

As thus illustrated, the invention comprises castings in the form of side frames 1 and 2, mounted on a base 3, the side frame 2 having a supplemental side frame 4 of suitable form, these frames forming the body of the machine to support certain stationary elements of the machine, and to provide bearings for shafts and other operative parts, as will hereinafter more fully appear. The body frame is provided with a transverse shaft 5 at the delivery end of the machine, where the finished box blanks fall off, and it will be understood that a similar shaft is provided at the other end of the machine (not shown), upon which are mounted suitable sprocket wheels 7 for the sprocket chains 8, which latter are parallel and arranged longitudinally of the machine. It will be seen that the parallel guides 9 are disposed immediately outside of said feed belts or sprocket chains, parallel therewith, said sprocket chains or feed belts being provided with sheet spacers 10, and with cleat pushers 11, to move the work along said guides. For this purpose, said feed belts or sprocket chains are given a continuous feeding motion by a sprocket-chain connection 12 with the sprocket 13 on the shaft 14, which latter is suitably geared to the shaft 15 at the bottom of the machine. The shaft 15, in turn, is connected by a sprocket-chain connection 16 with the overhead operating shaft 17, suitably supported in bearings on the upper portions of the side frames 1 and 2, which shaft 17 is in turn geared to the comparatively short drive shaft 18, upon which the friction clutch and drive pulley 19 are mounted, thereby to drive and operate the entire machine.

Looking at Fig. 14 of the drawings, it will be seen that the sheet spacers 10 engage the rear edges of the slats 20 of the blank, while the pushers 10 engage the rear ends of the cleats 21 of the blank. Said cleats have tongue and groove or tenon joints at their ends, when the blank is folded into box form, in the well known manner. The wires 22 are stapled to the slats at points a distance inside of the cleats 21, and the slats 20 are stapled to the cleats, whereby the product is a wire-bound box or crate blank having cleats, but having no wires attached to said cleats, and no wires that extend across the gaps or intervals between the ends of the cleats.

To drive the staples that secure the wires to the sheet material, and that secure the sheet material to the cleats, a swinging frame 23 is mounted on the overhead shaft 7, and is provided with a rigid horizontal and transverse bar 24 upon which the staplers 25 and 26 are mounted, these staplers being actuated by the cams 27 on said overhead shaft. The staplers 25 operate immediately above the cleats 21, and have no means for supplying binding wires to the blanks; but the staplers 26 operate immediately over the wires 22, and hence have guide rollers 28 to direct the binding wires 22 below these staplers and into position to be fastened to the blanks. The swinging frame 23 also has a lower rigid bar 29 upon which are mounted, in a detachable and adjustable manner, the castings 30, as shown, each casting being directly under one of the binding wires of the blanks. Each casting has a vertically reciprocating clinch block or clincher 31, of cylindrical form, held normally down against the horizontal and transverse cam shaft 32 by a suitable spring 33, as shown more clearly in Figs. 4 and 5 of the drawings. The cam shaft 32, it will be seen, is cut away or flattened on one side thereof, in order to function as a cam, thereby to reciprocate the clinchers 31 up and down, when the shaft is rotated. For the purpose of rotating this shaft 32, it is connected by a sprocket chain 34 with the shaft 17 previously mentioned, so that said shaft is driven in properly timed relation, thereby to elevate the clinchers 31 at the proper time, which is preferably immediately after the staples have been inserted through the sheet material, whereby the points of the staples are bent or clinched flush with the under side of the sheet material, the upper ends of the clinchers 31 being suitably formed for this purpose. In this way, said clinchers 31 are operative to clinch the points of the staples in the desired manner in a machine in which the feeding motion of the work is continuous, and in which these clinchers and their actuating cam shaft swing back and forth, and thus move forward a distance in unison with the work, while the staples are actually being driven, and then move backward a distance after the staples are fully inserted. At the same time, power connections are provided for operating said cam shaft, including the shaft 17 that has a stationary axis; but it will be seen that the back and forth motion of the shaft 32 is comparatively slight, in practice being ordinarily only a fraction of an inch, whereby it does not interfere with the proper driving or rotating of this cam shaft from the stationary shaft 17, the latter being stationary in the sense that it rotates about a fixed axis.

The swinging frame 23 is swung back and forth about its overhead axis, which is the axis of the shaft 17, by a link 35 connected to a bell crank 36 mounted on the body frame of the machine, which bell crank is in turn connected by a pitman rod 37 with the eccentric device 38 on the overhead shaft 17 previously mentioned. In this way, the bell crank 36 is rocked about its axis 39, in suitably timed relation, by power communicated thereto from the shaft 17, and this in turn causes a back and forth swinging motion of the frame 23, in the manner previously explained.

A hand lever 40 has a connection 41 extending to the clutch and pulley 19 previously mentioned, in any suitable manner, it will be understood, to thereby enable the attendant or operator of the machine to stop and start the machine at will, power from any source being communicated to the pulley 19, and from the latter to all operative parts of the machine.

Wire feeding devices 42, of any suitable character, are provided, as is common and usual, to feed the wires 43 from which the staples are made. This wire feeding means may be operated in any suitable manner, but is preferably supported by the beam or bar 24 of the swinging frame.

In a machine of this kind, for making wire-bound box blanks or crate blanks, it is essential, in order to measure up to the requirements of commercial production, on a quantity product basis, and to dispense with as much manual labor as possible, to provide wire cutters for severing the wires between blanks, it being understood that suitably wide spaces are left between the blanks, so that when the wires are cut, wire ends of suitable length will be left at each end of each blank. For this purpose, therefore, wire cutting mechanism 44 of any suitable known or approved character is provided in position to automatically sever the binding wires in the gaps or spaces between blanks, whereby each finished blank is severed from the following blank which is still under the staplers.

It will also be understood that the feed belts and the guides for the cleats are of any suitable or desired length, so that the helpers or operators who feed the materials to the machine may stand at one side thereof, or at both sides, and lay the cleats and sheet material in place over the feed belts and in the guides, in such manner as to insure a practically continuous stream of box blank materials under the staplers, whereby box blanks or crate blanks are made continuously and without stopping the machine between blanks, the blanks being cut apart while actually in motion at the delivery end of the machine.

Figure 6:
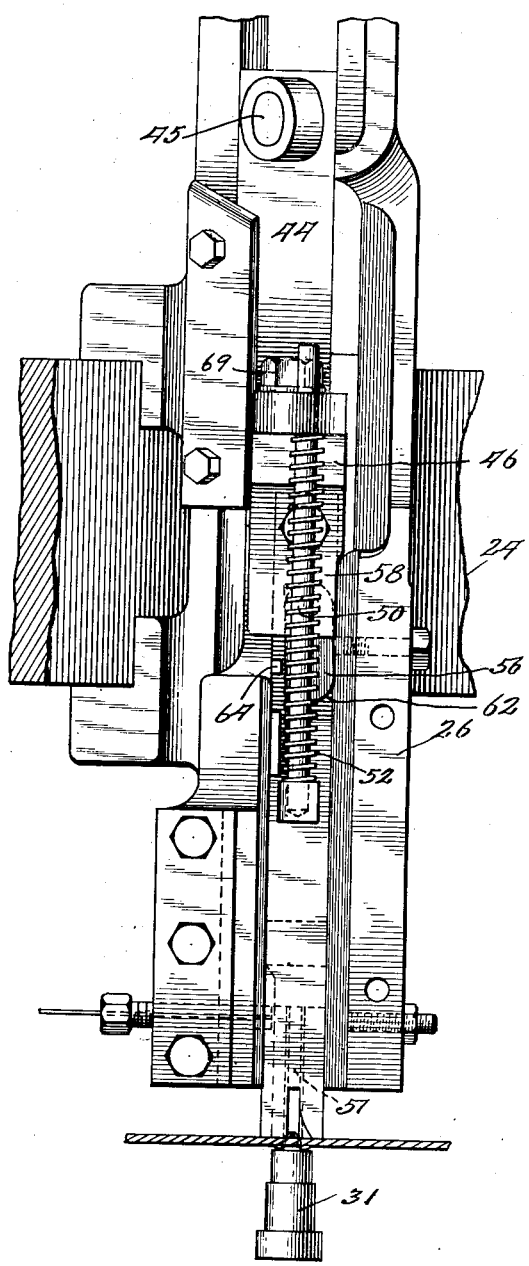
Figure 7:
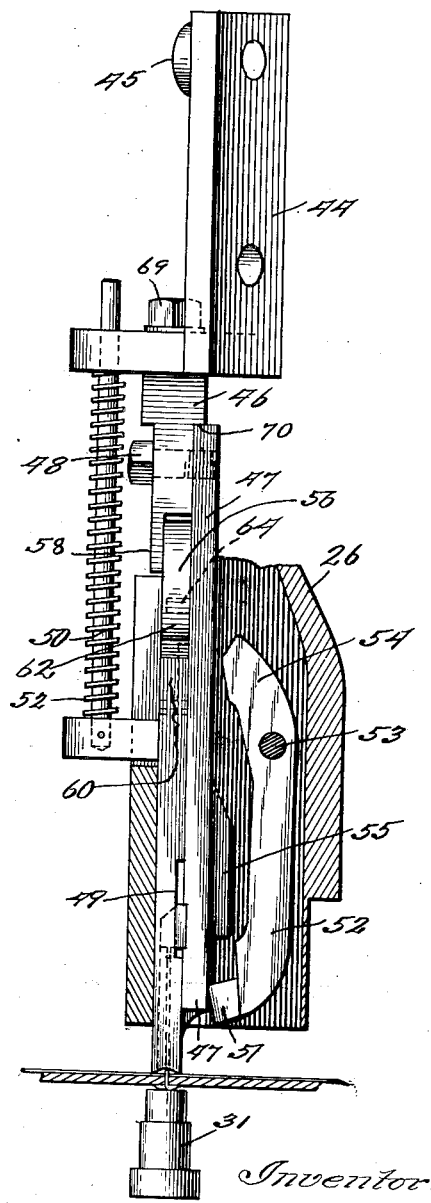
Figure 10:
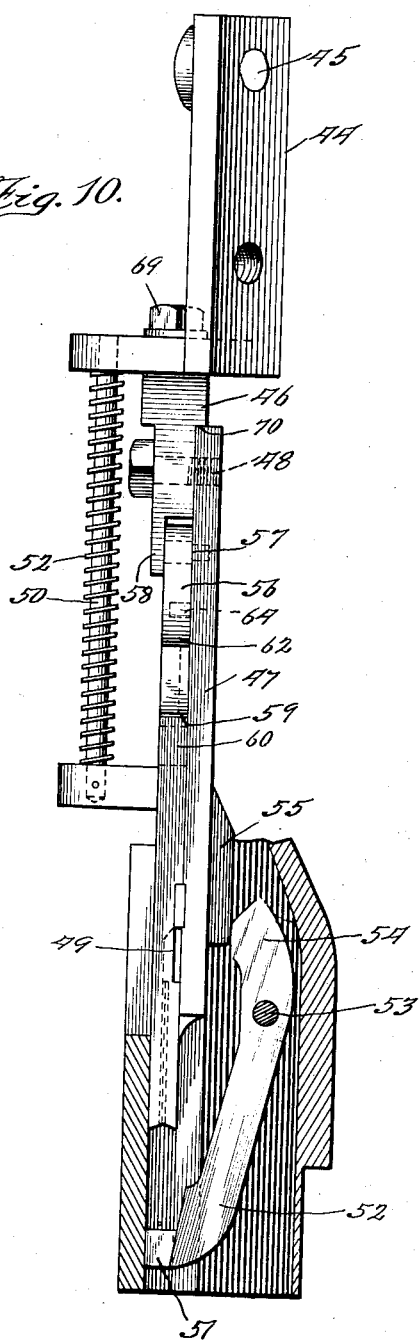
Figure 11:
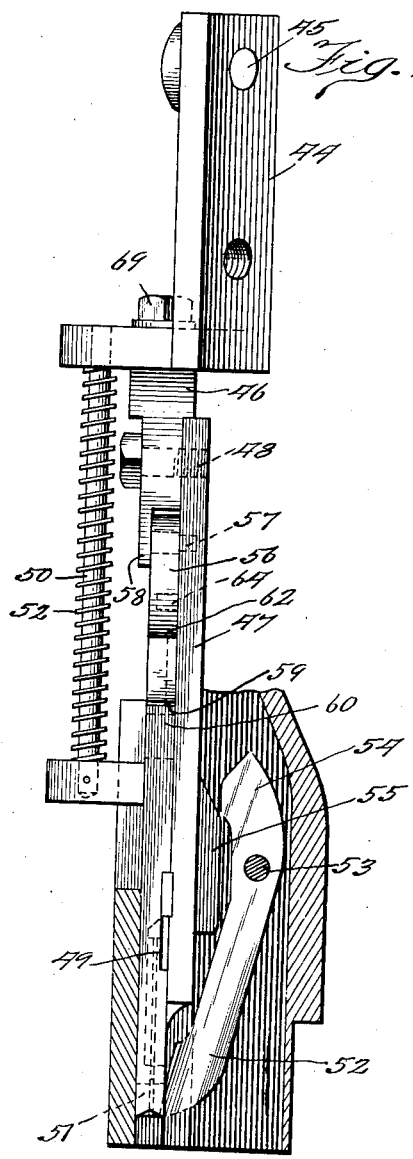

The staplers 26 may be of any suitable known or approved character, such as the stapler illustrated more or less in detail in Figs. 6, 7, 8, 9, 10, 11, 16, 17, 18, 19, 20, 21 and 22 of the drawings. As thus illustrated, each stapler 26 comprises a vertically reciprocating bar 44 provided with a roller 45 for engagement with the eccentric device 27 previously mentioned. This bar is rigidly connected with a drop piece 46, shown more clearly in Fig. 22 of the drawings, and this drop piece is rigidly bolted to the staple driver 47 by the bolt 48, as shown. The staple former 49 is slidable up and down on the staple driver, and has a yielding spring-rod sliding connection 50 with the lower end of the member 44, as shown, whereby the staple driver may continue to move downwardly to insert the staple, after the staple former has engaged the work, so that the staple former will guide the staple into the work, in the well known manner. The lower end of the staple former is adapted to cut off a length of staple wire, and is adapted to bend this length of wire over the lower end portion 51 of the loop bar 52, which is pivoted at 53, and which has its upper end portion 54 adapted to engage a cam 55 on the back of the staple driver, so that this loop bar will be held in operative position while the staple is being formed, but will be free to swing out of the way when the staple is formed and ready to be inserted by the staple driver. To lock the staple driver and staple former together, while the staple is being formed, a dog or detent 56 is pivoted at 57 between the lower end portion 58 of the drop piece 46 and the opposing surface of the staple driver. This dog has its lower end 59 adapted to engage the upper end portion 60 of the staple former, so that the latter and the staple driver will move downwardly together, while the staple is being formed. The dog 56 has a spring device 61 for holding it in normally operative position, but the cam 62 of this dog is adapted to engage the stationary cam 63, at a certain point in the downward movement, thereby to disengage the dog from the upper end portion 60 of the staple former, and thus permit the latter to come to rest on the work, while permitting the continuation of the downward movement of the staple driver. The device 61 comprises an elbow pin 64 arranged as shown, with one pin section 65 swiveled in the staple driver, and with the other pin section 66 provided with the coil spring 67 in the recess 68 of the dog 56 previously described, whereby this spring yieldingly resists the swinging or pivotal movement of the dog. By removing the bolt 48, the staple driver 47 is released, and the dog 56 is released from the pivot 57, and the staple driver and staple former are then separable from each other. A bolt 69 connects the member 40 with the upper end of the drop piece 46, which latter is in the vertical plane of the row of staples, so that the latter can be detached from said member 44, by removing said bolt, and in this way the different parts are easily assembled or separated.

It will be understood that the staplers 25 are of similar character, except that these staplers are not provided with the guide wheels 28 for guiding binding wires below these staplers, for the staplers 25 do not attach any binding wires to the blank materials. But otherwise, as shown, the staplers are all substantially alike, and are all operated in unison by the cam or eccentric devices 27 on the overhead shaft 17 previously mentioned. In each stapler, the upper end of the staple driver 47 engages a shoulder 70 on the drop piece 46, so that the downward thrust of the staple driver is positive and firm and through a rigid and solid connection with the vertically reciprocating member 44 previously described. It will also be understood that the lower end of each spring device 50 is fastened to the staple former, while the upper end of this device slides up and down in the outturned lower end portion of the member 44, in the well-known manner.

It will be seen that in positioning the staplers so that the binding wires are stapled only to the sheet material, and not to the cleats, the said binding wires are disposed far enough back from the heads or ends of the box or crate to prevent the binding wires from slipping off the corners of the box during shipping or transportation of the loaded boxes or crates. At the same time, these binding wires are close enough to the cleats to maintain their ends in proper engagement with each other when the box blanks are folded into box or crate form. Again, by setting the wires inside of the cleats, instead of attaching them to and over the cleats, the sheet material is less liable to fulcrum on the cleats, when it bulges outward under internal pressure, as the wires check or interrupt this fulcruming action before it reaches the cleats. Thus the wires are close enough to the cleats to resist the bursting strain on the wireless staples. But, it will be understood, of course, that the invention is not limited to any particular distance between the binding wires and the inner sides of the cleats, as the staplers may be located in position to attach the wires without inserting the staples in the cleats, at any suitable distance from the inner sides of the cleats, without departing from the spirit of the invention, so far as the stapling and wiring of a cleated blank, without stapling any wires to the cleats, is concerned, as the distance between the binding wires and the inner sides of the cleats depends upon the size of the box, and the use thereof, and other circumstances. But preferably the wires are close enough to the cleats to take the bursting strain on the side walls off the wireless staples.

It will also be seen that by inserting the binding wires adjacent the cleats inwardly a distance, so that they are not stapled to the cleats, these wires are not in danger of cutting into the tenons or joints between the ends of the cleats, in case of rough handling or rough usage. In other words, the wires cannot cut into the ends of the cleats and thereby contribute to the splitting or breaking of the cleats, as is common when the wires are fastened to and over the cleats, but at the same time the wires are close enough to the cleats to operate through the sheet material to hold the cleats in interlocked relation.

It will be understood that the wires 22 can be closer to the cleats 21 than is shown in Fig. 14, depending upon the requirements of different boxes or crates, boxes or crates of different sizes for different purposes. As shown, the staplers 26 are adjustable toward and away from the staplers 25, so that the wires 22 can be located wherever it may be desired to have them stapled to the blanks. For some purposes, it is better to have the wires as close as possible to the cleats, while under other conditions, or for other purposes, the location of the wires 22 a greater distance from the cleats will serve the purpose.

It will also be understood that a middle stapler (not shown) similar to the staplers 26 can be used on the machine, in order to staple another wire in place midway between the wires 22, and in that event, for example, the wires 22 can be located closer to the cleats.

As shown more clearly in Fig. 5 of the drawings, the clinch block mechanism 30 has a removable cap plate, with an opening therein for the upper end of the clinch block. In this way, by removing the said cap plate, the clinch blocks can be easily removed for repair or substitution, when they become worn or impaired by continued use.

What I claim as my invention is:

1. In stapling machinery, the combination of means for feeding the work continuously in a horizontally disposed plane, stapling mechanism movable back and forth over said plane, whereby said mechanism moves a distance with the work each time that staples are actually being inserted in the work, a clincher carried below the work to move back and forth in unison with said stapling mechanism, said clincher being mounted to reciprocate vertically to clinch the staples inserted through the materials comprising the work, means for moving said mechanism and clincher back and forth in the desired manner, means for actuating said stapling mechanism vertically, thereby to insert the staples downwardly through said materials, and means for actuating said clincher in suitably timed relation to said stapling mechanism.

2. A structure as specified in claim 1, said means for actuating the clincher comprising a horizontal and transversely arranged rotary cam shaft engaging the lower end of the clincher.

3. A structure as specified in claim 1, there being a swinging frame upon which said mechanism and clincher are carried, said frame having an overhead transverse axis of swinging motion, and said means for actuating the stapling mechanism vertically comprising rotary means mounted to rotate about said overhead axis.

4. A structure as specified in claim 1, said mechanism comprising a plurality of staplers spaced apart to insert staples crosswise of binding wires, thereby to attach said binding wires to the upper surface of said materials, and there being a plurality of said clinchers each disposed directly below and in line with one of said staplers.

5. A structure as specified in claim 1, said mechanism comprising a plurality of staplers spaced apart to insert staples crosswise of binding wires, thereby to attach said binding wires to the upper surface of said materials, and there being a plurality of said clinchers each disposed directly below and in line with one of said staplers in combination with cleat guides to guide wirebound box or crate blank cleats endwise, and said work-feeding means having provisions for positioning sheet material on said cleats.

6. A structure as specified in claim 1, said mechanism comprising a plurality of staplers spaced apart to insert staples crosswise of binding wires, thereby to attach said binding wires to the upper surface of said materials, and there being a plurality of said clinchers each disposed directly below and in line with one of said staplers, in combination with cleat guides to guide wirebound box or crate blank cleats endwise, said work-feeding means having provisions for positioning sheet material on said cleats, together with additional staplers for inserting staples through said sheet material into said cleats, thereby to attach only the sheet material to said cleats, whereby all binding wires of the blanks are subject to said reciprocating clinchers because located between the cleats in one guide and the cleats in the other guide.

7. In stapling machinery, the combination of a plurality of staplers mounted in spaced relation, means for feeding the work in a plane below said staplers, instrumentalities for feeding binding wires under only intermediate staplers, obviating the feeding of binding wires under the outer staplers, with means on said work feeding means to feed cleats for the wireless staples and means to position sheet material on the wireless cleats, and means to clinch the staples that have binding wires, whereby the machinery is operative to provide the work with parallel rows of wireless unclinched staples outside of parallel rows of clinched staples that have binding wires underneath the heads thereof, on the materials comprising said work, and means for actuating said staplers to insert the staples and attach the wires as stated to the materials to provide wirebound box or crate blanks, with said binding wires sufficiently close to said cleats to resist the bursting strain on the wireless staples, said staplers having a swinging motion back and forth above the work about an overhead transverse axis, said clinching means being supported for movement back and forth about said axis in unison with said staplers, and means to actuate said swinging clinching means.

8. In stapling mechanism for driving a row of staples, the combination of a staple driver, a vertically reciprocating member, a drop piece rigidly connecting said member with said staple driver, disposed in the vertical plane of the row of staples, a staple former slidably and yieldingly connected with said staple driver, a locking dog pivoted on said staple driver to engage said staple former, means for causing said locking dog to periodically disengage said staple former, and a loop bar co-operating with said staple former to form the staples, said locking dog being removably pivoted on one side of the staple driver, and said drop piece having an overlapping portion for holding the locking dog in place.

9. A structure as specified in claim 8, said drop piece being detachably connected to said vertically reciprocating member, and being detachably connected to said staple driver, and a spring device controlling said locking dog.

10. A structure as specified in claim 8, said drop piece having a straight shoulder engaging the upper end of said staple driver, sustaining the thrust on the driver, and means for detachably connecting the drop piece to the staple driver.

11. In stapling mechanism, the combination of a staple driver and a staple former, a locking dog pivoted on the staple driver and operative to engage and disengage the staple former, and a spring device comprising two right angle pins, with a coil spring on one pin, the other pin having a swivel support, and said dog having a recess to receive the pin having the spring thereon, whereby said locking dog is normally and yieldingly in engagement with a staple former.

12. In a stapling machine, the combination of instrumentalities for feeding the work materials in a horizontal plane, a stapler for inserting staples to secure the parts of the work together, an overhead shaft for operating said stapler, clinch-block mechanism comprising a vertically reciprocating clinch block, said clinch block having a lower position for the insertion of the staple, and having an upper position for the clinching of the staple points, power means operated from said shaft for vertically reciprocating said clinch block, and means driven from said overhead shaft for operating said feeding means.

13. A structure as specified in claim 12, said power means comprising a cam mounted to rotate about a horizontal axis, engaging the lower end of said clinch block.

14. A structure as specified in claim 12, said power means comprising a cam mounted to rotate about a horizontal axis, engaging the lower end of said clinch block, together with a spring to maintain the lower end of said clinch block in operative engagement with said cam.

15. A structure as specified in claim 12, said power means comprising a cam mounted to rotate about a horizontal axis, there being a plurality of these clinch blocks in alignment above said axis, and said cam comprising a rotary shaft cut away on one side thereof, adapted to actuate the clinch blocks in unison.

16. A structure as specified in claim 12, said clinch-block mechanism having a body casting, within which the entire block is enclosed and supported at its lower end, and having a top plate thereon provided with an opening for the upper end portion of the clinch block, said top plate being removable.

17. A structure as specified in claim 12, said power means comprising a cam and a sprocket chain drive from said shaft for continuously rotating said cam in timed relation to the stapling mechanism.

18. In a stapling machine, the combination of work feeding means for moving the work forward, a stapler movably mounted to insert staples in the moving work, clinch block mechanism below the work and also movable a distance therewith, while the staples are being clinched, and power transmitting connections for operating said clinch block mechanism during its forward movement with the work.

19. A structure as specified in claim 18, comprising a vertically reciprocating clincher, and means receiving power from said power transmitting connections to actuate the clincher.

20. A structure as specified in claim 18, said stapler and clinch block mechanism being movable in unison about a common overhead axis, and said power transmitting connection comprising a sprocket chain driven from said axis.

21. In a stapling machine, the combination of instrumentalities for feeding the work materials in a horizontal plane, a stapler for inserting staples to secure the parts of the work together, an overhead shaft for operating said staplers, and clinch-block mechanism comprising a vertically reciprocating clinch block, said clinch block having a lower position for the insertion of the staple, and having an upper position for the clinching of the staple points, together with power means operated from said shaft for vertically reciprocating said clinch block, said power means comprising a cam mounted to rotate about a horizontal axis, engaging the lower end of said clinch block.

22. In a stapling machine, the combination of instrumentalities for feeding the work materials in a horizontal plane, a stapler for inserting staples to secure the parts of the work together, an overhead shaft for operating said stapler, and clinch-block mechanism comprising a vertically reciprocating clinch block, said clinch block having a lower position for the insertion of the staple, and having an upper position for the clinching of the staple points, together with power means operated from said shaft for vertically reciprocating said clinch block, said power means comprising a cam mounted to rotate about a horizontal axis, engaging the lower end of said clinch block, together with a spring to maintain the lower end of said clinch block in operative engagement with said cam.

23. In a stapling machine, the combination of instrumentalities for feeding the work materials in a horizontal plane, a stapler for inserting staples to secure the parts of the work together, an overhead shaft for operating said stapler, and clinch-block mechanism comprising a vertically reciprocating clinch block, said clinch block having a lower position for the insertion of the staple, and having an upper position for the clinching of the staple points, together with power means operated from said shaft for vertically reciprocating said clinch block, said power means comprising a cam mounted to rotate about a horizontal axis, there being a plurality of these clinch blocks in alignment above said axis, and said cam comprising a rotary shaft cut away on one side thereof, adapted to actuate the clinch blocks in unison.

24. In a stapling machine, the combination of instrumentalieies for feeding the work materials in a horizontal plane, a stapler for inserting staples to secure the parts of the work together, an overhead shaft for operating said stapler, and clinch-block mechanism comprising a vertical reciprocating clinch block, said clinch block having a lower position for the insertion of the staple, and having an upper position for the clinching of the staple points, together with power means operated from said shaft for vertically reciprocating said clinch block, said clinch-block mechanism having a body casting, within which the entire block is enclosed and supported at its lower end, and having a top plate thereon provided with an opening for the upper end portion of the clinch block, said top plate being removable.

WALTER F. NEWHOUSE.